United States Patent
Carney et al.

(10) Patent No.: US 6,899,223 B2
(45) Date of Patent: May 31, 2005

(54) FORM FOR A PACKAGE AND METHOD OF MAKING SAME

(75) Inventors: Hayden A. Carney, La Canada, CA (US); Anthony B. Joyce, North Hollywood, CA (US)

(73) Assignee: Bert-Co Industries, Inc., Los Angeles, CA (US)

(*) Notice: Subject to any disclaimer, the term of this patent is extended or adjusted under 35 U.S.C. 154(b) by 65 days.

(21) Appl. No.: 10/143,109

(22) Filed: May 9, 2002

(65) Prior Publication Data

US 2003/0211924 A1 Nov. 13, 2003

(51) Int. Cl.⁷ ............................................. B65D 85/57
(52) U.S. Cl. .................. 206/308.1; 206/313; 206/784; 229/100; 229/933; 493/111
(58) Field of Search ................. 206/472, 784, 206/307, 308.1, 308.3, 312, 313, 232; 229/100, 72, 933–936; 493/90, 111

(56) References Cited

U.S. PATENT DOCUMENTS

| | | |
|---|---|---|
| 404,411 A | 6/1889 | Huewe |
| 909,410 A | 1/1909 | Hirsch |
| 918,093 A * | 4/1909 | Sales .......................... 229/306 |
| 956,343 A * | 4/1910 | Harker ......................... 229/72 |
| 958,059 A | 5/1910 | Wright |
| 1,186,312 A | 6/1916 | Hanselmann |
| 1,226,531 A * | 5/1917 | Kebbell ..................... 206/418 |
| 1,266,091 A | 5/1918 | Basch |
| 1,461,961 A * | 7/1923 | Bergstein .................... 229/152 |
| 1,463,413 A | 7/1923 | Wilburger |
| 1,502,312 A | 7/1924 | Mayhew |
| 1,926,365 A * | 9/1933 | Bergstein .................... 493/309 |
| 2,112,062 A | 3/1938 | Berger ........................ 229/27 |
| 2,189,076 A | 2/1940 | Liskin ........................ 229/87.5 |
| 2,287,365 A | 6/1942 | Widder et al. ................ 129/15 |

(Continued)

FOREIGN PATENT DOCUMENTS

| | | | |
|---|---|---|---|
| CA | 1198208 | 12/1985 | |
| DE | 3425579 A1 | 1/1986 | |
| EP | 0159860 A2 | 10/1985 | |
| FR | 1050913 | 9/1953 | ................. 206/312 |
| GB | 2135274 A | 8/1984 | |
| GB | 2147262 A | 5/1985 | |
| JP | 3827510 | 12/1938 | |
| JP | 5054108 | 9/1948 | |
| JP | 5118742 | 5/1972 | |
| JP | 5653501 | 12/1981 | |
| JP | 57173174 | 10/1982 | |
| JP | 5856379 | 4/1983 | |
| JP | 59161561 | 10/1984 | |
| JP | 59185769 | 12/1984 | |
| JP | 59185772 | 12/1984 | |
| JP | 6015887 | 2/1985 | |
| JP | 331748 | 7/1991 | |

OTHER PUBLICATIONS

Photograph of Grateful Dead Record Album Cover, "Europe 1972" ©1972, Warner Bros. Records Inc.

(Continued)

*Primary Examiner*—Jim Foster
(74) *Attorney, Agent, or Firm*—Edward C. Schewe; Sheldon & Mak

(57) ABSTRACT

A form for a package for holding consumer articles including optically-based media. The form is a base sheet with a central section and a series of foldable adjoining flaps extending from the central section in alternate first and second directions. The flaps are adapted to be folded over the central section and then secured to the central section for mounting one or more holders, such as one or more trays for digital video disks. The invention includes the package made from the form and a method of making the form from a blank sheet of paperboard material.

10 Claims, 2 Drawing Sheets

U.S. PATENT DOCUMENTS

| | | | |
|---|---|---|---|
| 2,384,633 A | 9/1945 | Markowski | 206/82 |
| 2,419,187 A | 4/1947 | Jolly | 40/152 |
| 2,436,744 A | 2/1948 | Chouinard | 129/20 |
| 2,463,338 A | 3/1949 | Wechsler | 206/80 |
| 2,600,023 A | 6/1952 | Rice | 206/62 |
| 2,721,556 A | 10/1955 | Zandelin | 129/20 |
| 3,132,795 A | 5/1964 | Allison | 229/68 |
| 3,145,026 A | 8/1964 | Shaw | 274/42 |
| 3,232,423 A | 2/1966 | Smiler | 206/62 |
| 3,292,285 A | 12/1966 | Kitayama | 40/64 |
| 3,556,391 A | 1/1971 | Kosterka | 229/68 |
| 3,594,976 A | 7/1971 | Jackson | 53/31 |
| 3,620,552 A | 11/1971 | Woodcock | 281/33 |
| 3,640,447 A | 2/1972 | Forbes, Jr. et al | 229/17 R |
| 3,688,898 A | 9/1972 | Stanton | 206/62 P |
| 3,698,544 A | 10/1972 | Growney | 206/45.11 |
| 3,717,397 A | 2/1973 | Perry | 229/72 |
| 3,743,081 A | 7/1973 | Roberg et al. | 206/1 R |
| 3,785,478 A | 1/1974 | Drori | 206/45.31 |
| 3,819,093 A | 6/1974 | Forbes, Jr. | 222/529 |
| 3,869,820 A | 3/1975 | Holson | 40/159 |
| 3,946,937 A | 3/1976 | Forbes, Jr. et al. | 229/51 TC |
| 4,002,355 A | 1/1977 | Sendor | 281/29 |
| 4,084,690 A | 4/1978 | Pulse | 206/310 |
| 4,101,028 A | 7/1978 | Woolbright | 206/311 |
| 4,108,307 A | 8/1978 | Feingold et al. | 206/387 |
| 4,166,570 A | 9/1979 | Lazerand et al. | 229/52 B |
| 4,176,744 A | 12/1979 | Borzak | 206/303 |
| 4,240,761 A | 12/1980 | Jacobson | 402/76 |
| D264,602 S | 5/1982 | Plutsky | D19/26 |
| 4,327,831 A | 5/1982 | Inaba et al. | 206/310 |
| 4,365,708 A | 12/1982 | Tyus | 206/309 |
| 4,387,804 A | 6/1983 | Austin | 206/218 |
| 4,433,780 A | 2/1984 | Ellis | 206/232 |
| 4,473,153 A | 9/1984 | Colangelo | 206/312 |
| 4,488,645 A | 12/1984 | Yamaguchi | 206/444 |
| 4,501,361 A | 2/1985 | Rose, Jr. | 206/493 |
| 4,511,034 A | 4/1985 | Pan | 206/310 |
| 4,520,927 A | 6/1985 | Sato | 206/387 |
| 4,535,888 A | 8/1985 | Nusselder | 206/444 |
| 4,635,792 A | 1/1987 | Yamada et al. | 206/310 |
| 4,709,812 A | 12/1987 | Kosterka | 206/310 |
| RE33,503 E  * | 12/1990 | Schluger | 206/45.29 |
| 5,188,229 A  * | 2/1993 | Bernstein | 206/308.1 |
| 5,318,222 A  * | 6/1994 | Bartlett | 229/72 |
| 5,647,482 A  * | 7/1997 | Kleinfelder | 206/308.1 |
| 6,276,522 B1 * | 8/2001 | Walter | 206/264 |
| 6,443,301 B2 * | 9/2002 | Garnier | 206/312 |

OTHER PUBLICATIONS

Photograph of Neil Diamond Album "Jonathan Livingston Seagull Original Motion Picture Soundtrack," ©1973 CBS. Inc.

Handbook of Folding Carton Style Nomenclature, ©1988, Paperboard Packaging Council.

Copies of photographs of Exhibit 115 from the Deposition of James Ladwig taken on Jun. 28, 2002, and pages from the Jun. 28, 2002 deposition transcript identifying Exhibit 115.

A Copy of Exhibit 115A from the Deposition of James Ladwig taken on Jun. 28, 2002, and pages from the Jun. 28, 2002 deposition transcript identifying Exhibit 115A.

* cited by examiner

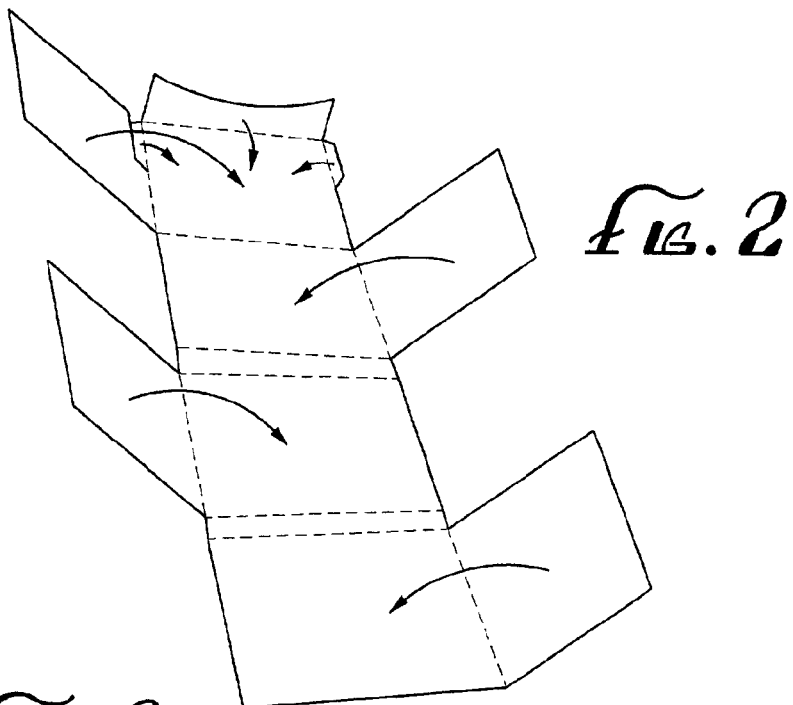
fig. 2
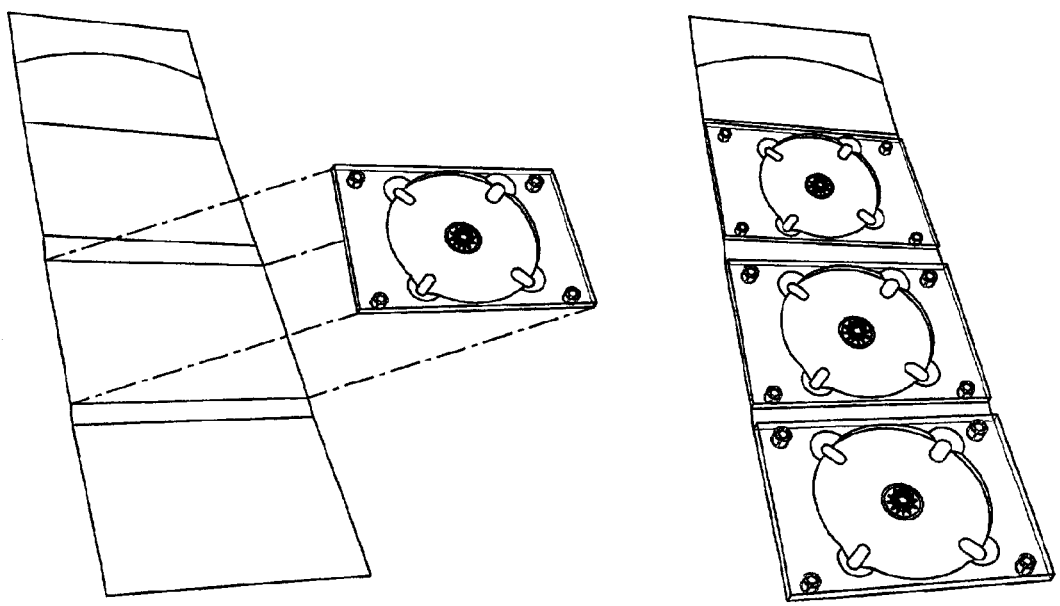
fig. 3
fig. 4

FORM FOR A PACKAGE AND METHOD OF MAKING SAME

BACKGROUND

The use of die-cut paperboard for packaging a variety of consumer goods is increasingly popular given paperboard's versatility, light weight and relatively low cost. Further, it is beneficial for a packaging manufacturer to produce a number of package styles which are producible from a common form, yet appear to be different when finished.

Optically-based media used for the storage of digital information is a type of packaged consumer good that is increasingly popular because it is economical. Optically-based media are used for the recording and distribution of computer programs, music, and video programs. In the context of digital video disks ("DVDs"), it is often desired to produce and sell DVDs in multi-disk sets. Examples of such sets are collections of several motion pictures, collections of television programs having a common featured actor or subject matter or collections of several episodes of a popular television series.

It has become common to market DVD's as a collection in a package which opens and closes in a book-like manner. The package includes an individual plastic tray for each DVD in the set with the trays being mounted to different "pages" of a paperboard element which is foldable on itself into a compact closed form. The paperboard stock commonly used in the manufacture of such a package is relatively light in weight and is preferred because of its low cost per unit area.

Conventional paperboard stock packages described as useful for packaging compact discs have inherent shortcomings. For example, U.S. Pat. No. 4,709,812 describes a compact disc ("CD") package and method of making same that is limited to a rectangular sheet configuration. This conventional rectangular configuration limits the ability to creatively package a multi-disk CD collection. In addition, the rectangular sheet configuration has a medial fold which allows for one weak edge when the sections are folded. Over years of repeated use, this weak edge on the folded-up package may tear along the medial fold line.

The paperboard packaging material is most economically obtained from large sheets of stock paperboard material. It is desirable that as many package units as possible be obtained from a single blank sheet of the stock. Therefore, it is desirable that the outlines of multiple package forms nest in close relation on the sheet, thereby to minimize waste of the stock material and to enable efficient printing on one side of the sheet before the sheet is die cut to create individual forms. Thus, there is a need for an improved form for a package and there is a need for an improved method of making the form from a sheet of stock paperboard material.

SUMMARY

The present invention is an improvement over conventional prior art packaging and methods of making forms for packages. The present invention enables the manufacture of packages of different styles based upon a basic form. The invention is preferably implemented by use of lightweight paperboard which can bear high quality printing on at least one surface.

The present invention has an advantage over conventional packages because the fold-over flaps are folded from alternating directions over a central portion to create a strong structural package. In one version, the form has a base having a surface with a top, a bottom, and opposing first and second sides, the base comprising a series of central portion sections extending between the bottom and the top which are separated from each adjoining section by one or more fold lines. The form has a series of adjoining flaps which are adapted to be folded over the corresponding adjoining central section from the opposite] sides.

The version can include an end flap adjacent to the top. The version may include additional sections and can include additional sections and adjoining flaps. In one version, the holders comprise trays for digital video disks.

The present invention includes a method of making a package from the inventive form. In this method, the adjoining flaps are folded over and secured onto each of their corresponding adjoining central sections by an adhesive or other conventional methods. One or more holders are secured onto one or more of the combination of the sections and the secured flaps. This assembly can be folded into a book-like package and later opened when desired to remove the article(s) in the package. The holders can be used for holding a variety of consumer goods. In one version, the method is for a package with holders for digital video disks.

The present invention includes a method of making the form from a nested arrangement on the paperboard stock. This advantageously allows for easier stripping of the forms from the stock material and from each other. In one version, the form is manufactured by die cutting at least two of the forms from a sheet of paperboard, wherein the forms nest on the paperboard sheet.

DRAWINGS

FIG. 2 is a perspective view of the version of FIG. 1, with the printed side flipped over from FIG. 1, showing the folding of the adjoining flaps and the folding of the end flap;

FIG. 3 is a perspective view of the version of FIG. 1 showing the possible placement of a holder;

FIG. 4 is another perspective view showing the version of FIG. 1 with multiple holders secured to the folded-up form;

DESCRIPTION

Figure 1:
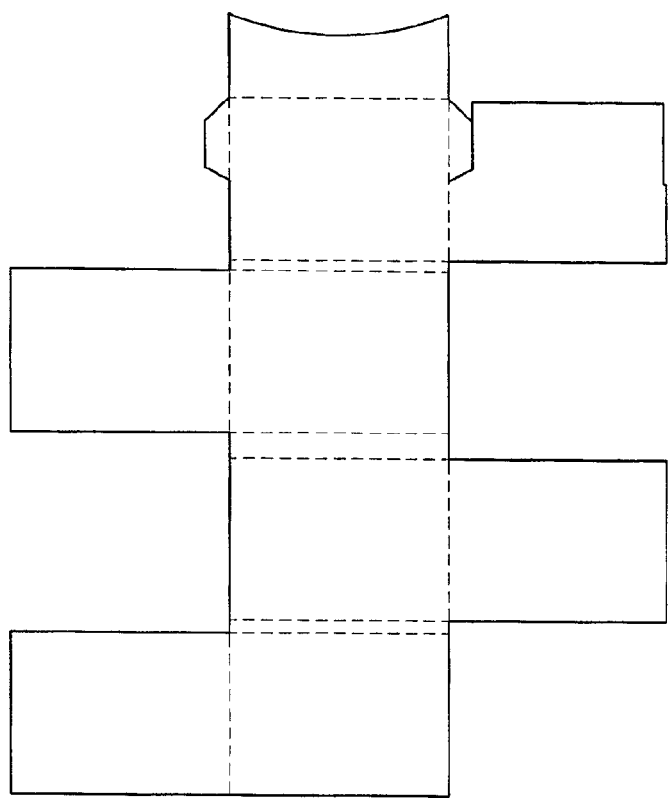
FIG. 1 is a plan view of a preferred version of a form for packaging according to the present invention.

The present invention is an improvement over conventional forms and an improvement over conventional packages and methods of making the package forms. Referring to the Figures, a preferred form 10 according to the present invention is shown in FIG. 1. The form 10 comprises a base 12 having adjacent sections 20, 22, 24 and 26 which span between the bottom 27a to the top 27b of the form 10 as shown in FIG. 1. Preferably, the sections 20, 22, 24 and 26 are substantially rectangularly shaped as shown in FIG. 1. The sections 20, 22, 24 and 26 are separated by one or more parallel fold lines 28 as shown in FIG. 1. The sections are arranged in a row in a central portion of the form 10, and so can be referred to as central sections of the form 10. The form 10 is preferably made of paperboard. Where two adjacent central sections are separated by plural fold lines, those fold lines are separated from each other by hinge areas of the form.

The form 10 comprises side flaps 30, 32, 34 and 36 which adjoin sections 20, 22, 24 and 26, respectively. As shown in FIG. 1, these flaps 30, 32, 34 and 36 alternate between a side 37a and a second side 37b of the row of central sections of form 10. For example, the flap 30 adjoins the section 20 and extends from the first side 37a of the form 10, flap 32 adjoins the section 22 extending from the second side 37b of form 10, the flap 34 adjoins the section 24 extending from the first side 37a of the form 10, while the flap 36 adjoins the section 26 and extends from the second side 37b of form 10. That is, side flaps 30 and 34 are located in a first side row of the base to one side of the row of central sections, and side flaps 32 and 36 are located in a second side row to the other side of the row of central sections.

The side flaps 30 and 34 on the first side 37a adjoin their corresponding sections along the preferably aligned fold lines 38a. The side flaps 32 and 36 on the second side 37b adjoin their corresponding sections along fold lines 38b. Preferably, the form 10 has an end flap 40 with adjacent tabs 40a and 40b to hold promotional materials by folding the end flap 40 over section 26 along the fold line 28, folding the adjacent tabs 40a and 40b as shown in FIG. 2 and adhering the tabs 40a and 40b to the underside of the end flap 40, as folded over section 26, by an adhesive, glue or other conventional techniques. Each side flap preferably has a height in a direction parallel to the length of the row of central sections which is not greater than the height of the corresponding central section, and is so positioned relative to the corresponding central section that when the side flaps are folded into overlying relation to their corresponding central section no portion of the side flaps overlies a fold line 28 bounding that central section.

FIG. 2 shows (by arrows) folding of the side flaps 30, 32, 34 and 36 into overlying relation onto their corresponding central sections along the respective fold lines 38a and 38b. The form 10 is shown with the printed side down in FIG. 2. Each side flap may be affixed to its corresponding central section by conventional methods such as adhesives, glue or other techniques well known to persons skilled in the art.

One or more holders, such as trays 50, may be attached to one or more of the folded over side flaps 30, 32, 34 and 36 as shown in FIG. 3. The trays 50 may be affixed to this arrangement, comprised of two layers of base material as a result of adherence of the side flaps to the central sections, by conventional methods such as adhesives, glue or other techniques well known to persons skilled in the art. FIG. 4 illustrates one version of the present invention showing multiple trays 50 secured onto the flaps 30, 32 and 34 as folded over onto and adhered to the corresponding central sections 20, 22 and 24.

Figure 4A:
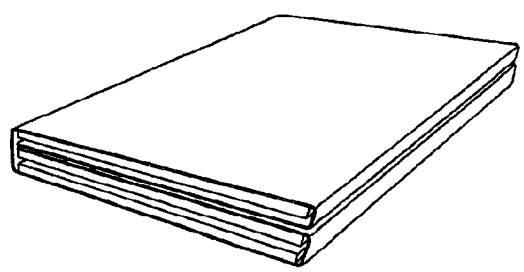
FIG. 4a shows a preferred version of FIG. 4 folded-up into a package.

FIG. 4a shows a version of a book-like package 52 folded up from the version in FIG. 4. Preferably, the outermost surface 52a of package 52 is pre-printed with a design or other information to reflect the contents of the package 52. Preferably package 52 is housed in a slipcase or sleeve, not shown.

Figure 5:
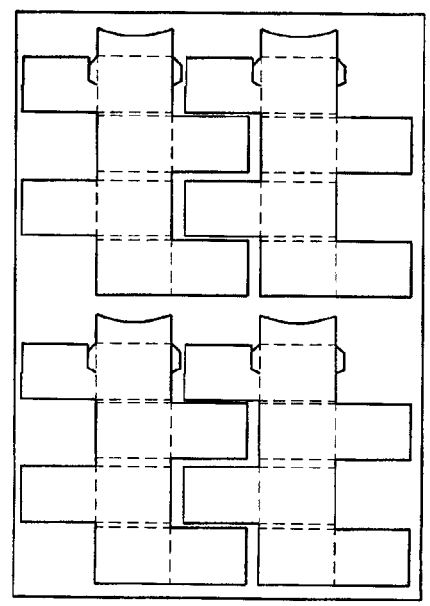
FIG. 5 is a plan view showing a preferred method of making multiple forms according to the present invention simultaneously.

FIG. 5 illustrates a preferred method of making multiple forms 10 by printing the forms 10 onto a sheet of stock paperboard material 60. As shown in FIG. 5, the preferred method minimizes waste from stock material 60 by nesting one form 10 within the unused portion of stock material 60 between flaps, for example, by nesting or interdigitating side flaps 32 and 36 of one form 10 with or between flaps 30 and 34 of an adjacent form 10, so that the overall width on the stock material 60 of the nested forms is significantly less than the sum of the widths of the individual forms.

Thus, an improved form with fold-over flaps for added strength for use in a book-like package is shown and described. An improved method of making the form to minimize waste materials from a sheet of stock paperboard material is also shown and described.

Although the present invention has been described in considerable detail with reference to certain preferred versions thereof, other versions are possible. For example, additional sections may be included or additional sections with adjoining flaps may be utilized. Therefore, the spirit and scope of the appended claims should not be limited to the description of the preferred versions contained herein. All features disclosed in the specification, including the claims, abstract, and drawings, and all the steps in any method or process disclosed, may be combined in any combination, except combinations where at least some of such features and/or steps are mutually exclusive or inconsistent or incompatible with each other. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Also, any element in a claim that does not explicitly state "means for" performing a specified function or "step for" performing a specified function, should not be interpreted as a "means" or "step" clause as specified in 35 U.S.C. § 112.

What is claimed is:

1. A form for a package, comprising:
   (a) base having a surface with a top, a bottom, and opposed first and second sides, the base comprising first, second, third and fourth sections extending between the bottom and the top, each section being separated from each adjoining section by a pair of fold lines with a hinge area therebetween, at least two of the hinge areas being of different width;
   (b) a first flag adjoining the first section and extending from the first side, the first flap being adapted to be folded onto and secured to the first section;
   (c) a second flap adjoining the second section and extending from the second side, the second flap being adapted to be folded onto and secured to the second section;
   (d) a third flap adjoining the third section and extending from the first side, the third flap being adapted to be folded onto and secured to the third section;
   (e) a fourth flap adjoining the fourth section and extending from the second side, the fourth flap being adapted to be folded onto and secured to the fourth section;
   (f) a foldable end flap and adjacent tabs adjoining the top; and
      at least one of the sections and its corresponding flap, when the corresponding flap is secured to the section, being adapted for mounting one or more holders,
      wherein the form with secured flaps and mounted holders can then be folded up into a book-like package.

2. The form of claim 1 further comprising fold lines separating the flaps and the corresponding adjoining sections.

3. The form of claim 1 further comprising additional sections.

4. The form of claim 1 further comprising additional sections and adjoining flaps.

5. The form of claim 1 wherein the holders comprise trays for digital video disks.

6. A method of making a package from a form comprising:
- (a) a base having a surface with a top, a bottom, and opposed first and second sides, the base comprising first, second, third and fourth sections extending between the bottom and the top, each section being separated from each adjoining section by one or more fold lines;
- (b) a first flap adjoining the first section and extending from the first side, the first flap being adapted to be folded onto and secured to the first section;
- (c) a second flap adjoining the second section and extending from the second side, the second flap being adapted to be folded onto and secured to the second section;
- (d) a third flap adjoining the third section and extending from the first side, the third flap being adapted to be folded onto and secured to the third section;
- (e) a fourth flap adjoining the fourth section and extending from the second side, the fourth flap being adapted to be folded onto and secured to the fourth section;
  - at least one of the combination of the sections and the secured flaps being adapted for mounting one or more holders,
  - the method comprising the steps of:
    - (i) folding and securing the first, second, third and fourth flaps onto each of their corresponding adjoining first, second, third and fourth sections;
    - (ii) after step (i), securing one or more holders onto one or more of the combination of the sections and the secured flaps; and
    - (iii) after step ii, folding the form into a book-like package.

7. The method of claim 6 wherein the flaps are secured to their corresponding sections with an adhesive.

8. A method of making a package for digital video disks from a form comprising:
- (a) a base having a surface with a top, a bottom, and opposed first and second sides, the base comprising first, second, third and fourth sections extending between the bottom and the top, each section being separated from each adjoining section by one or more fold lines;
- (b) a first flap adjoining the first section and extending from the first side, the first flap being adapted to be folded onto and secured to the first section;
- (c) a second flap adjoining the second section and extending from the second side, the second flap being adapted to be folded onto and secured to the second section;
- (d) a third flap adjoining the third section and extending from the first side, the third flap being adapted to be folded onto and secured to the third section;
- (e) a fourth flap adjoining the fourth section and extending from the second side, the fourth flap being adapted to be folded onto and secured to the fourth section;
  - at least one of the combination of the sections and the secured flaps being adapted for mounting one or more holders that comprise trays for digital video disks,
  - the method comprising the steps of:
    - (i) folding and securing at least the first, second, third and fourth flaps onto each of their corresponding adjoining first, second, third and fourth sections;
    - (ii) after step (i), securing one or more of the trays onto one or more of the combination of the sections and the secured flaps; and
    - (iii) after step (ii), folding the form into a book-like package.

9. The book-like package made according to claim 8 comprising one or more digital video disks therein.

10. A form for a package, comprising:
- a base having a surface with a top, a bottom, and opposed first and second sides, the base comprising first, second, third and fourth sections extending between the bottom and the top, each section being separated from each adjoining section by one or more fold lines;
- (b) a first flap adjoining the first section and extending from the first side, the first flap being adapted to be folded onto and secured to the first section;
- (c) a second flap adjoining the second section and extending from the second side, the second flap being adapted to be folded onto and secured to the second section;
- (d) a third flap adjoining the third section and extending from the first side, the third flap being adapted to be folded onto and secured to the third section;
- (e) a fourth flap adjoining the fourth section and extending from the second side, the fourth flap being adapted to be folded onto and secured to the fourth section;
- (f) one or more holders mounted onto at least one of the combination of the sections and the secured flaps, wherein the one or more holders comprise trays for digital video disks and the form can then be folded up into a book-like package.

* * * * *